A. WOLF.
PICTURE FRAME.
No. 10,097. Reissued Apr. 25, 1882.
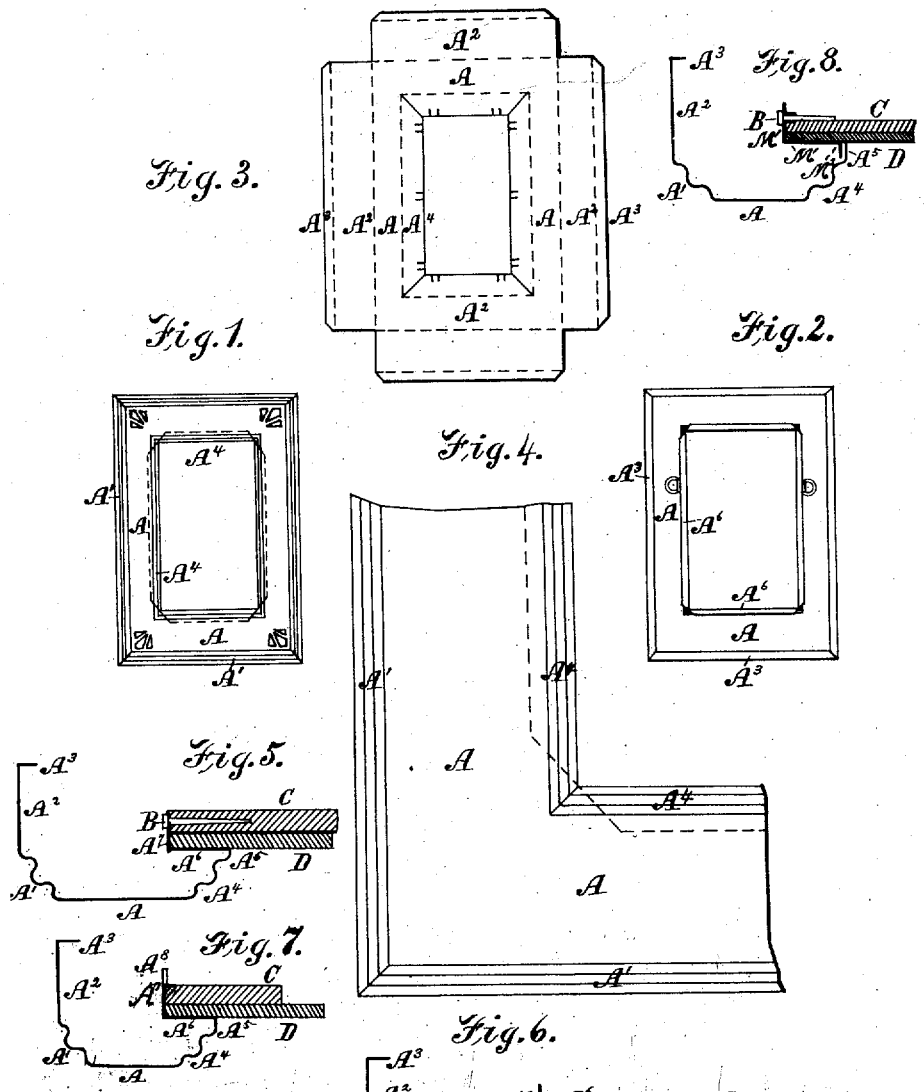
Witnesses:
J. Hinton Hyde
Joseph H. Clarke
Inventor:
Abraham Wolf
by
C. Wylie Betts
Attorney.

UNITED STATES PATENT OFFICE.

ABRAHAM WOLF, OF NEW YORK, N. Y.

PICTURE-FRAME.

SPECIFICATION forming part of Reissued Letters Patent No. 10,097, dated April 25, 1882.

Original No. 240,873, dated May 3, 1881. Application for reissue filed January 3, 1882.

*To all whom it may concern:*

Be it known that I, ABRAHAM WOLF, a citizen of the United States, residing in New York city, in the State of New York, have invented certain new and useful Improvements in the Construction of Frames for Pictures, Looking-Glasses, and the like, of which the following is a specification.

I make my frame of sheet metal. The front is in a single piece. By properly operating the dies ordinary sheet metal—as good tinned iron—can be wrought in very perfect forms and made to present a rich, substantial, and massive appearance, with sufficient strength for all ordinary uses. Sheet metal may be readily struck in ordinary dies so as to present a considerable amount of embossed effect; but for rectangular frames a sufficient depth from front to rear is best attained by first cutting out a portion from each corner. In forming the frame the cut edges are brought together and may be afterward secured either by solder alone or by a suitable internal gusset. The back edge may be for some uses left raw; but I esteem it a much more perfect finish to flange the back edge inward. The inner edge of the frame involves more elaboration. It is especially important that the frame shall present a neat and finished appearance at the inner edge. It is almost equally important that it shall be plane, so as to make a close joint with plate-glass applied behind it. A considerable portion of the metal from the interior of the frame, where the picture or looking-glass is ultimately to appear, is removed in as perfect condition as practicable, and may be subsequently used for manufacturing other articles; but a portion around the edge of the interior is left attached to the metal of the frame, and is bent backward and outward. It is extended backward to give depth and the appearance of a solid body, and then outward from the inner edge of the frame in a plane parallel to the glass, and adapted to lie closely thereto. Beyond this point, in preparing for the reception of the glass, or of the glass and picture, and for securing the same properly in the frame, I can adopt different plans. One, the simplest, is to use only the metal which comes from the area within the frame, and to bend it sharply backward along a line just exterior to the edge of the glass and provide holes for the insertion of nails or other pins, or else again bend the metal around the back of the picture or glass or backing-board. A fault with this arrangement is that it is impossible by such metal to cover the corners of the picture, for although a large portion along each of the edges can be thus bent, and makes a secure support to retain the glass, picture, and backing-board, yet the corners, being exposed, are liable to gather dust and to damage the picture or the glass. Another plan is to provide a separately-formed piece of sufficiently stout sheet metal and fit it to the outwardly-bent flange of the main body, soldering it in such position that it serves in effect as a unit therewith, while by reason of its being made from a separate piece of suitable size it may protect all parts of the edge of the glass and of the picture and backing-board, the corners included.

The following is a description of what I consider the best means of carrying out the invention.

The accompanying drawings form a part of this specification.

Figure 1 is a face view of the frame complete. Fig. 2 is a back view. Fig. 3 shows the metal after it is cut in the proper condition, but before it has been formed into the required shape by dies or otherwise. Fig. 4 is a face view of the corner of the frame on a larger scale. The moldings $A'$ and $A^4$ may, however, be omitted, or may be in any other form of ornamentation. Fig. 5 is a cross-section through the completed frame, and also through the flanges for giving depth, and for securing the glass or picture. Fig. 6 is a cross-section through a modification. Fig. 7 is a cross-section corresponding to Fig. 5, but with the glass and backing-board secured without nails by an additional bend in the metal. Fig. 8 is a cross-section through a modification.

Similar letters of reference indicate corresponding parts in all the figures.

Referring to Figs. 1 and 2, A is a plane surface of sheet metal which is left unaffected by the treatment and forms a plane face to the finished frame. $A'$ is a series of beads, which for ornament, may be made exterior to A. $A^2$ is a part bent backward from A to give depth to the frame and a solid appearance; $A^3$, a portion near the edge, which is bent inward at right angles to $A^2$ to give a finish. $A^4$ is a series of beads which may be placed upon the frame around the inner edge of A. $A^5$ is a portion extending backward from A, or from $A^4$ at right angles to A, to give depth and finish to the frame. $A^6$ is a portion extending outward in a plane parallel to A, and $A^7$ a portion bent directly backward from and at right angles to $A^6$ to secure the glass or picture. The portion $A^7$ may be perforated to receive nails B, which are driven into or over an ordinary wood back, C; or it may be again bent around the back of the glass, picture, or wood back, as in Fig. 7. In front of the back C, and between it and the flat surface of sheet metal $A^6$, lies the glass D. Between the glass D and the back C a picture may lie in the ordinary manner. The depth of the part $A^5$ may be slight, to conform to the present ordinary taste in regard to frames; but that and all the other parts may be varied within wide limits. It is important that the surface $A^6$ be so held as to fit closely against the plane face of glass D, especially at the inner edge.

In the modification shown in Fig. 6 the metal is not extended rearward from the outer edge of A'. The metal is sheared by dies or otherwise, so as to bring the edge in the plane portion A'. A piece of sheet metal separately formed by hand or by machinery, as shown by M M', is applied in the position shown and secured by soldering or otherwise. This modification may be made more complete than that shown in Figs. 1 and 2, because if due care is exercised in the forming and soldering to avoid distortion of the metal at any stage the surface $A^6$ makes the same plane bearing for the front of the glass as before, while the piece M M' may not only afford a holding material for the nails or other fastenings along the middle portion of each edge of the glass, picture, and back, but may, by reason of its being separately made, be extended quite up to the corners and protect the corners equally with other portions.

The part M M' may be formed without joint from a sufficiently large rectangular piece of metal, the center, which is removed, being capable of subsequent use for other purposes; or I can make the part M M' from a long narrow strip of metal, forming it around by any suitable tools and joining the ends by solder or otherwise. I slit the back edge of the part $A^7$ and bend any desired portion of the slitted metal inward to lap upon the wood C, and thereby confine it without the necessity of nails. This can be equally well done with the added piece M. Fig. 7 shows such mode of fastening at $A^8$.

Modifications may be made in the proportions within wide limits without sacrificing the advantages of the invention. It produces a frame which is jointless and complete in its entire front face, may be made highly decorative, and is absolutely proof against warping and all ordinary destructive agencies. My frames may be more than usually strong. They may be produced at very slight cost by suitable machinery. It is obviously not important that the front and main surface A of the frame shall be plane. It may be varied according to taste.

I have in my experiments observed a disposition of the metal to crinkle at the corners. A good way to avoid this may be to produce by the dies an ornament which will take up the surplus metal.

Fig. 8 is a section through a further modification. In this the part $A^6$ is omitted, and the part M' is formed forward at the inner edge, as indicated by $M^2$. The solder joins the part $M^2$ to the part $A^5$.

I can make the part M M' $M^2$ from separate strips of metal, joined together or not, but bent and soldered to the portion $A^5$, as shown in Fig. 8.

I claim as my invention—

1. A rectangular picture-frame formed of one piece of sheet metal having the front A in one piece without joint, the outer portion, $A^2$, bent backward to give depth, and the inner edge, $A^5$, bent also backward to give depth, and then bent outward, as at $A^6$, for the purpose of securing the glass or picture, as herein specified.

2. A rectangular picture-frame formed of one piece of sheet metal having the front A in one piece without joint, the outer portion, $A^2$, bent backward to give depth, and the inner edge, $A^5$, bent also backward to give depth, and then bent outward, as at $A^6$, and then again bent backward, as at $A^7$, to hold the glass or picture in position, substantially as described.

3. The rectangular picture-frame, of sheet metal, herein described, having the front A in one piece without joint, the outer surface, A', and the inner edge, $A^4$ $A^5$ $A^6$, formed under and bent outward in a plane to match the plane surface of the glass, arranged in the ordinary position, as herein specified.

4. In a picture-frame, the backwardly-extended portion $A^7$, in combination with the plane portion $A^6$, produced in one piece with the main body $A^5$ $A^4$ $A^3$ $A^2$ A' A, as herein specified.

ABRAHAM WOLF.

Witnesses:
C. WYLLYS BETTS.
J. E. HINTON HYDE.